Sept. 7, 1954
R. C. PIERCE
2,688,480
AXLE MOUNTING
Filed Oct. 15, 1951
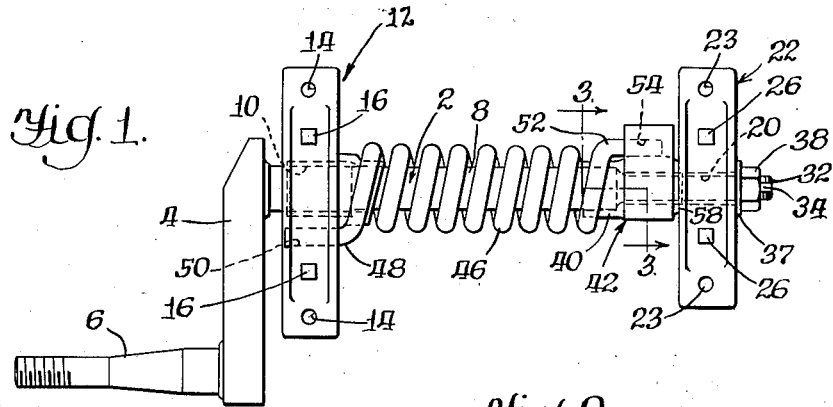
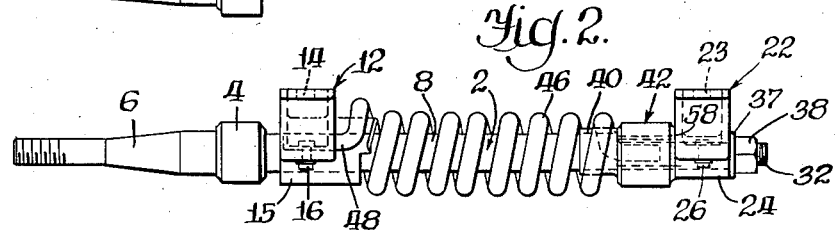
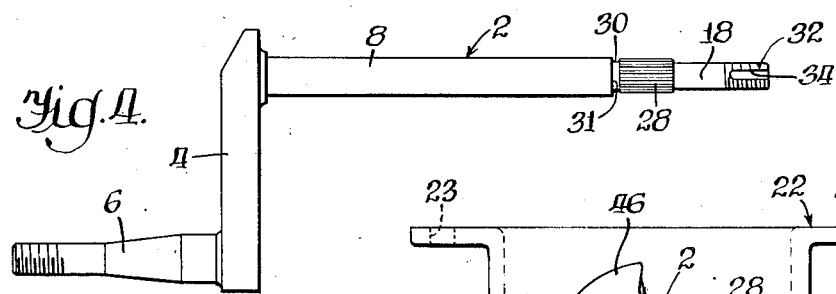
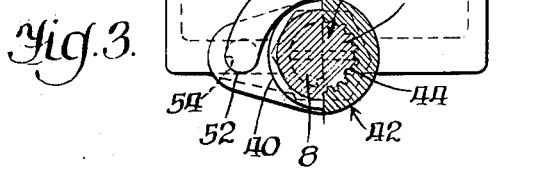
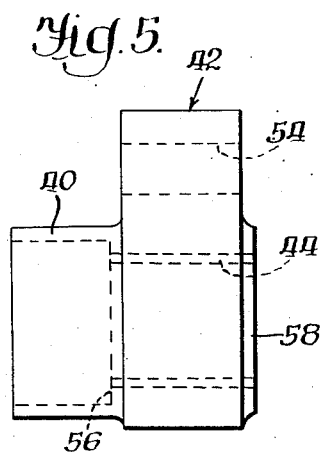
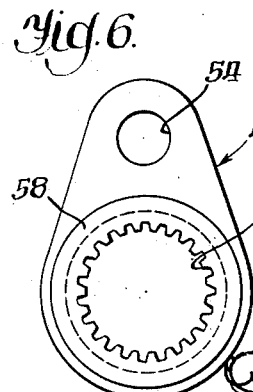
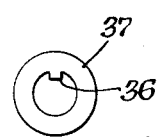
INVENTOR.
Raymond C. Pierce
BY
Atty Patented Sept. 7, 1954

2,688,480

UNITED STATES PATENT OFFICE 2,688,480

AXLE MOUNTING

Raymond C. Pierce, Chicago, Ill.

Application October 15, 1951, Serial No. 251,301

2 Claims. (Cl. 267—58)

This invention relates to axle assemblies and more particularly to a novel assembly of the type in which the axle is provided with at least one crank having attaching means for a wheel of the vehicle supported by the assembly.

A primary object of the invention is to devise an assembly, such as above described, wherein readily replaceable spring means are provided for supporting the load of the vehicle.

A more specific object of the invention is to provide novel means for anchoring the ends of the spring means to the vehicle and to the axle, respectively.

A further object of the invention is to devise an axle assembly wherein the crank may be positioned in any desired rotational angular position and may then be quickly and easily anchored to the spring which is effective to resist upward rotation of the crank relative to the supported vehicle in response to the load thereof.

A more detailed object of the invention is to provide the axle with larger and smaller-diameter bearing portions rotatably journaled within spaced brackets of the vehicle and to provide the axle with a splined segment between said portions having a complementary fit within a splined socket of an anchor or lever member to which the spring is removably connected, whereby the axle, upon removal of its retaining means, may be disassembled from the brackets and the spring by pulling the axle from the brackets and anchor.

The foregoing and other objects and advantages of the invention will become apparent from a consideration of the following specification and the accompanying drawings, wherein:

Figure 1 is a top plan view of an axle assembly embodying a preferred form of the invention;

Figure 2 is a side elevational view of the structure shown in Figure 1;

Figure 3 is an enlarged sectional view on the line 3—3 of Figure 1;

Figure 4 is a top plan view of the axle of the assembly shown in Figures 1 to 3;

Figure 5 is an enlarged side elevational view of the spring anchor or lever;

Figure 6 is an end elevational view of the spring anchor taken from the right of Figure 5, and Figure 7 is an end elevational view of the retainer washer shown in Figures 1 and 2.

Describing the invention in detail, the axle, generally designated 2, comprises a crank 4 at one end thereof having a spindle 6 for attachment in the usual manner to a supporting wheel (not shown).

The axle comprises a larger-diameter, cylindrical bearing portion 8 rotatably journaled within a complementary bearing 10 of a bracket 12 which may form an integral part of a supported vehicle (not shown) such as a trailer or tank, or may be removably attached thereto as by any conventional means such as a weld or rivet (not shown) through openings 14 of the bracket 12. The bearing portion 8 of the axle is retained within the bearing 10 by a cap 15 removably attached as by bolt and nut assemblies 16 to the underside of the bracket 12.

The axle 2 is provided inboardly of its end remote from the crank 4 with a smaller-diameter bearing portion 18 rotatably journaled within a complementary bearing 20 of a bracket 22 which may be formed as an integral part of the supported vehicle (not shown) or may be removably attached thereto, as by any conventional means such as welds or rivets (not shown) through openings 23 of bracket 22. The bearing portion 18 is retained within the bearing 20 by a cap 24 removably attached to the underside of the bracket 22, as by bolt and nut assemblies 26.

The outboard end of the smaller-diameter bearing portion 18 terminates in a splined segment or portion 28 having splines extending approximately parallel to the rotational axis of the axle 2, as best seen in Figure 4; and the outboard end of the splined segment 28 is connected to the larger-diameter bearing portion 8, which is preferably grooved as at 30 at its juncture with the splined segment 28 to afford a shoulder 31 serving a purpose hereinafter described.

The inboard end of the smaller-diameter bearing portion 18 is threaded as at 32 and is provided with an axial key-way 34 for reception of a complementary key 36 (Figure 7) of a washer 37 sleeved over the portion 18 and positioned between the bracket 22 and a retainer nut 38, which is threaded on the threads 32 and is preferably secured by conventional cotter means (not shown). As best seen in Figures 1 to 3, the larger-diameter bearing portion 8 of the axle 2 is snugly and slidably fitted within a sleeve 40 on the outboard end of a spring anchor or lever 42, which is provided with a splined socket 44, slidably engageable with the splined segment 28 of the axle 2.

A coil spring 46 is sleeved over the axle portion 8 and is anchored at one end thereof by an axially parallel segment 48 slidably fitted within a complementary opening 50 of the bracket 12, the opposite end of said spring having a substantially parallel segment 52 slidably fitted within a complementary opening 54 of the anchor or lever member 42.

As best seen in Figure 5, the anchor 42 comprises a shoulder 56 at the inner end of the sleeve 40 for engagement with the shoulder 31 of the larger-diameter axle portion 8, when the parts are in the assembled relationship shown in Figures 1 to 3; and the anchor 44 is provided with an oppositely facing boss 58 snugly and slidably seated against the outboard side of the bracket 22, as best seen in Figures 1 and 2.

As will be noted in Figure 4, the splined segment 28 is of smaller-diameter than the bearing portion 8 of the axle and the bearing portion 18 of the axle is of a smaller-diameter than the splined segment 28 thereof, to facilitate assembly and disassembly of the device. In assembling the parts, the caps 15 and 24 may be secured to the brackets 12 and 22, respectively, and the spring 46 may be anchored to the bracket 12 and to the anchor or lever member 42, whereupon the smaller-diameter portion 18 of the axle 2 may be inserted through the bearing 10 and spring 46 and into the socket 44 of the anchor 42. The crank 4 may then be rotated to any desired rotational angular position with respect to the vehicle whereupon the axle 2 may be moved further to the right, as seen in Figures 1 and 2, thereby slidably engaging the splined segment 28 of the axle within the splined socket 44 of the anchor member 42 until the shoulder 31 of the axle snugly abuts the shoulder 56 of the anchor member 42 at the inner end of its sleeve 40. The washer 37 is then slipped onto the threaded end 32 of the axle with the key 36 in the keyway 34, and the nut 38 is then tightened to engage the shoulder 31 of the axle snugly against the shoulder 56 of the anchor 42 and to snugly and slidably engage the boss 58 of the anchor against the outboard side of the bracket 22.

As the spring 46 takes set, under service conditions, adjustment of the axle 2 may be quickly affected by removing the nut 38 and washer 37 and moving the axle 2 to the left, as seen in Figures 1 and 2, until the splined segment 28 is moved from the socket 44 of the anchor 42 whereupon the crank 4 may be rotated to accommodate set of the spring 46, and the axle 2 may then again be moved to the right to re-engage the splined segment 28 in the socket 44 of the anchor 42, whereupon the washer 37 and nut 38 may be reassembled.

I claim:

1. In an axle assembly for a vehicle; the combination of an axle having a larger-diameter, cylindrical portion journaled within a bearing of said vehicle, a crank connected to said portion at one end thereof and having wheel attaching means, an axially splined segment connected to said axle portion at the opposite end thereof, said segment being of smaller diameter than that of said portion, another bearing portion connected to said splined segment at the end thereof remote from the larger-diameter portion, said other portion being of smaller diameter than that of the splined segment, a lever having a sleeve snugly fitted over said larger-diameter portion and having a splined socket fitted over said segment in complementary splined engagement therewith, a spring anchored to the vehicle and lever, and removable retaining means on the end of said other portion remote from said segment.

2. An axle assembly for a vehicle comprising an axle having a larger-diameter, cylindrical portion journaled in a bearing of said vehicle and having a smaller-diameter, cylindrical portion journaled in another bearing of the vehicle, said axle having a splined segment between said bearing portions, the segment being of smaller diameter than the first mentioned portion and being of greater diameter than the second mentioned portion, a crank on the end of the first mentioned portion remote from said segment, wheel attaching means on said crank disposed eccentrically with respect to said portions and segment, an anchor member having a splined socket fitted on said segment in complementary splined engagement therewith, said anchor member having a sleeve snugly fitted over said larger-diameter portion, a coil spring sleeved over the first mentioned portion and having approximately parallel end segments, one of said end segments being slidably fitted within a complementary opening of the vehicle, and the other of said end segments being slidably fitted within a complementary opening of the anchor member, and removable retaining means on the end of said smaller-diameter portion remote from said segment.

References Cited in the file of this patent

UNITED STATES PATENTS

| Number | Name | Date |
|---|---|---|
| 1,956,877 | Prouty et al. | May 1, 1934 |
| 1,970,823 | Suczek | Aug. 21, 1934 |
| 2,103,590 | Lefevre | Dec. 28, 1937 |
| 2,455,787 | Linn | Dec. 7, 1948 |

FOREIGN PATENTS

| Number | Country | Date |
|---|---|---|
| 651,726 | Germany | Oct. 18, 1937 |
| 772,052 | France | Aug. 6, 1934 |